Patented Oct. 27, 1953

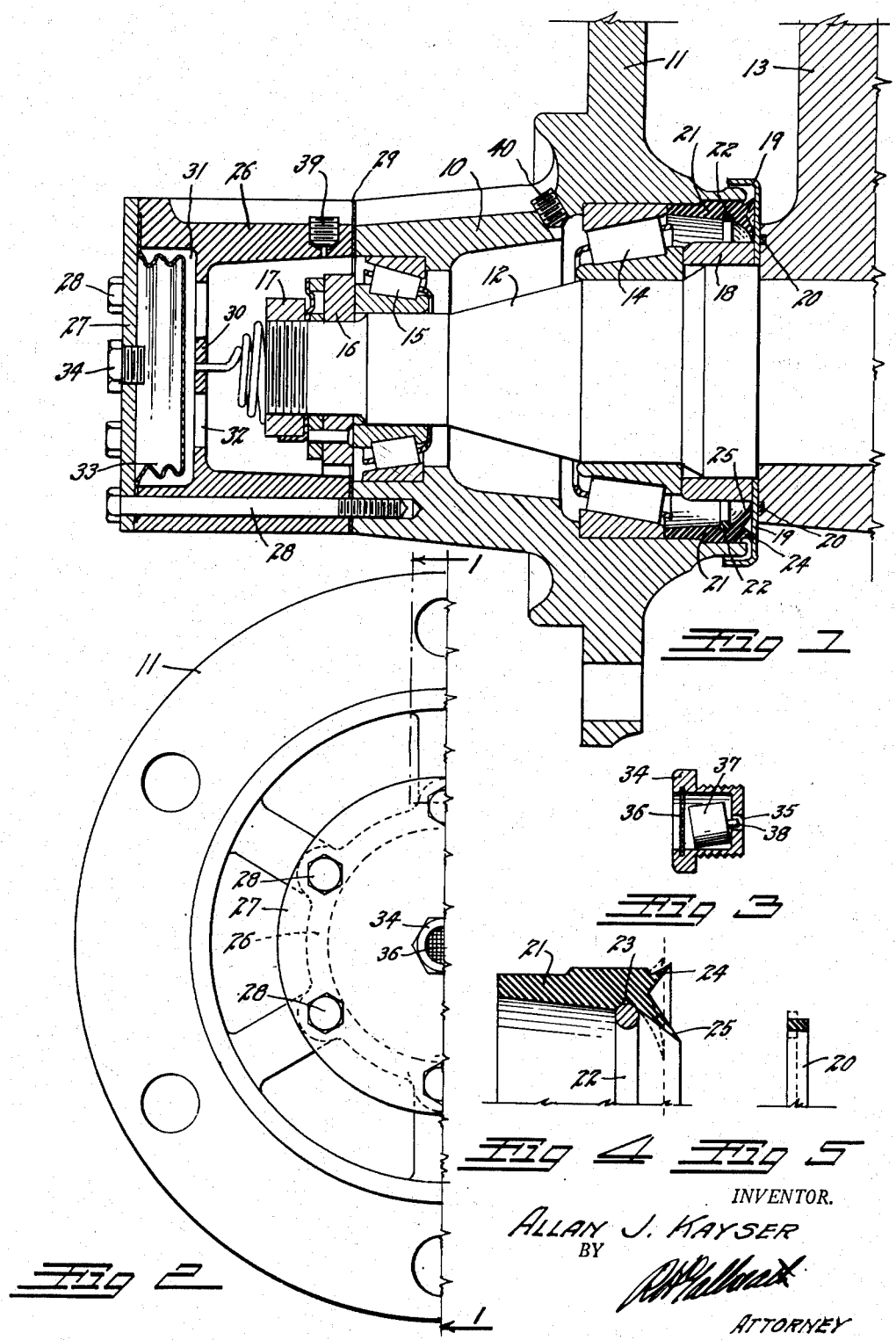

2,657,104

UNITED STATES PATENT OFFICE 2,657,104

WATER SEALING DEVICE FOR AUTOMOTIVE WHEELS

Allan J. Kayser, Denver, Colo., assignor of fifty per cent to Maurice L. Kurland, forty per cent to Grace K. Israel, and ten per cent to Rosalind L. Kayser, all of Denver, Colo.

Application May 10, 1951, Serial No. 225,646

2 Claims. (Cl. 308—187.1)

This invention relates to a sealing device for the hubs of the wheels of vehicles, and is more particularly designed for lubricating and protecting wheel hubs on trailers and the like which must at times operate under the surface of water.

The principal object of the invention is to provide a construction for vehicle wheel hubs which will enable fluid lubricating oil to be used in place of the greases and hard oils ordinarily used so that extremely low temperatures will not affect the lubrication efficiency of the hub.

Another object is to provide a construction which will effectively prevent the entrance of water into the hub, and also prevent the discharge of oil from the hub, even though the wheel be driven below a water surface.

A further object of the invention is to provide a construction which can be applied to present wheel bearings without requiring any change therein.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a vertical cross-section through a conventional wheel hub of the type for which the invention is designed, the section being taken on the line 1—1, Fig. 2;

Fig. 2 is a fragmentary side view, showing one-half of the wheel hub of Fig. 1;

Fig. 3 is an enlarged, longitudinal section through a return flow check valve employed in the invention;

Fig. 4 is an enlarged, fragmentary section, illustrating one type of sealing gasket employed for sealing the wheel hub; and Fig. 5 is a similar section through a second type of sealing gasket.

In the drawing, conventional parts of a wheel mounting are illustrated and designated by numeral as follows: wheel hub 10, wheel hub flange 11, axle spindle 12, axle spindle support 13, inner roller bearings 14, outer roller bearings 15, bearing retainer washer 16, retaining nut 17, and inner bearing spacer 18.

The invention is designed to allow the hub 10 to be completely filled with lubricating oil so that the bearings 14 and 15 will operate completely immersed in fluid oil. This is accomplished by placing a cup-like backing plate 19 between the spacer 18 and the axle spindle support 13. A first annular, resilient, sealing ring gasket 20 is inset in an annular groove formed in the support 13 concentric with the axis of the spindle 12. The backing plate 19 is clamped against the gasket 20 and against the support 13 by the clamping action of the retaining nut 17 so that the plate 19 remains stationary against the compressed gasket 20. The gasket 20 has a normally greater width than thickness, as shown in solid line in Fig. 5. When compressed into its ring groove, it is deformed to less width than thickness, as shown in broken line in this figure, so that it will have an inherent tendency to expand against all sides of the groove and against the backing plate to maintain a tight seal thereagainst.

A second resilient, inner sealing ring gasket 21 is positioned within the inner extremity of the hub 10. The second resilient, inner gasket has a normal diameter in excess of the internal diameter of the hub so that it must be compressed before being inserted in the latter.

A rigid ring 22 is positioned in an annular receiving notch 23, formed about the inner circumference of the gasket 21, before the latter is compressed and forced into the hub. The rigid ring 22 acts to compress the periphery of the ring gasket 21 tightly against the inner surface of the hub 10 to prevent any leakage thereby. The outer annular edge of the gasket 21 rests against the outer bearing race of the inner bearing 14, which acts to limit the amount of insertion of the gasket into the hub.

The gasket 21 is molded with a tapered, outwardly flaring, outer skirt 24, and with a similar, but longer, tapered, inner skirt 25. The two skirts project from the inner annular edge of the gasket 21 in substantially V-shaped relation, and terminate in thin, sharp, annular, feather edges. The two skirts 24 and 25 project normally as shown in solid line in Fig. 4. When in place in the wheel, however, the movement of the wheel toward the backing plate 19 as the former is secured in place, causes the outer skirt 24 to flex outwardly and the inner skirt 25 to flex inwardly, as shown in broken line in Fig. 4 and solid line in Fig. 1.

As the wheel rotates, the feather edges of the skirts 24 and 25 wipe against the smooth outer surface of the backing plate 19 to provide perfect sealing engagement therewith. The outer skirt 24 acts to prevent external fluids and other foreign materials from entering the hub 10, and the inner skirt 25 acts to prevent the discharge of fluids from the hub.

It will be noted that external pressure against the outer skirt, and internal pressure against the inner skirt, act to force the skirts more tightly into sealing engagement with the backing plate 19 so as to prevent any leakage past the skirts. Since the skirts are rotating, any oil reaching the feather edge of the inner skirt will be picked up by the gasket 21 and thrown toward the inner bearing 14.

The above structure effectively seals the inside of the hub 10. The outside of the hub is sealed by means of a cylindrical hub cap 26 closed by a cover plate 27. Cap screws 28 extend through the cover plate 27 and through the cap 26 into tapped holes in the hub 10 to tightly clamp the cover plate to the cap, and the cap to the hub against a suitable sealing gasket 29.

A partition wall 30 extends across the hollow interior of the cap 26 in spaced relation to the outer extremity of the latter to form a bellows chamber 31 therein. The partition wall 30 is provided with suitable communicating openings 32 communicating between the chamber 31 and the hollow interior of the cap. A hollow, flexible, cup-like, expansible bellows 33 is carried in the bellows chamber 31. The peripheral edge of the bellows 33 is sealed between the cover plate 27 and the hub cap 26.

A check valve bushing 34 is tapped through the cover plate 27. The valve bushing is hollow and is provided with a bleed port 35 in its inner end, and with a retaining screen 36 in its outer end. A float 37 is contained within the bushing 34 and provided with a teat 38 which extends into the bleed port 35. The float may be of any material which will float upon water, such as varnished cork or the like.

The hub cap 26 is provided with a vent plug 39 and a filling plug 40. The entire hollow hub is completely filled with lubricating oil. During the filling operation the vent plug 39 is removed to allow air to exit from the hub as it fills with oil. The plug 39 is then replaced and filling is continued until the level of the filler plug 40 is reached, so that the air within the hub is reduced to a minimum. The plug 40 is then replaced, and the bearing is ready for use.

Increased atmospheric temperatures and the friction of use will cause the oil to expand in the hub. This expansion is accommodated by the bellows 33, which compresses as the oil expands. Compression of the bellows forces air from the latter through the bleed port 35 and the bushing 34.

Should the vehicle drive below the surface of water, the water will lift the float 37 and the pressure of the water will force the float toward the bleed hole 35 to seal the latter so as to prevent the entrance of water into the bellows 33.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A hub for wheels, comprising: a hollow, tubular hub surrounding an axle spindle; bearings in said hub riding on said spindle; a sealing ring sealing the inner extremity of said hub to said spindle; a hub cap sealing the outer extremity of said hub about said spindle; a compressible chamber in said hub sealed from the oil therein; and means allowing air to escape from said chamber as the oil in the hub expands.

2. A hub for wheels as described in claim 1 having a check valve; and a valve float in said check valve which will close the latter when said hub is submerged to prevent the entrance of water into said compressible chamber.

ALLAN J. KAYSER.

References Cited in the file of this patent

UNITED STATES PATENTS

| Number | Name | Date |
|---|---|---|
| 583,050 | Grant | May 25, 1897 |
| 1,231,218 | Swenson | June 26, 1917 |
| 2,251,760 | Schantz et al. | Aug. 5, 1941 |
| 2,311,287 | Boden | Feb. 6, 1943 |
| 2,391,007 | Buckendale | Dec. 18, 1945 |
| 2,516,191 | Englesson | July 25, 1950 |

FOREIGN PATENTS

| Number | Country | Date |
|---|---|---|
| 657,692 | Germany | Mar. 10, 1938 |